US005079412A

United States Patent [19]

Sugiyama

[11] Patent Number: 5,079,412

[45] Date of Patent: Jan. 7, 1992

[54] POINT OF SALE DATA PROCESSING APPARATUS FOR HANDY TYPE BAR CODE READER WHICH CAN BE FLUSH MOUNTED

[75] Inventor: Takahide Sugiyama, Shizuoka, Japan

[73] Assignee: Tokyo Electric Co., Ltd., Tokyo, Japan

[21] Appl. No.: 339,475

[22] Filed: Apr. 17, 1989

[30] Foreign Application Priority Data

Apr. 21, 1988 [JP] Japan .................................. 63-96727

[51] Int. Cl.[5] ...................... G06K 15/00; G06F 15/24; G06F 15/26; G06F 15/20

[52] U.S. Cl. .................................. 235/383; 235/385; 235/375; 235/472; 235/454

[58] Field of Search ............... 235/472, 454, 383, 385, 235/375, 472; 364/405

[56] References Cited

U.S. PATENT DOCUMENTS

| | | | |
|---|---|---|---|
| 4,220,991 | 9/1980 | Hamano et al. | 364/405 |
| 4,511,944 | 4/1985 | Saito | 360/86 |
| 4,588,282 | 3/1986 | Levine | 358/300 |
| 4,722,054 | 1/1988 | Yorozu et al. | 364/405 |
| 4,766,297 | 8/1988 | McMillan | 235/470 |
| 4,775,883 | 7/1988 | Uehira | 360/55 |
| 4,812,985 | 3/1989 | Hambrick et al. | 235/385 |
| 4,838,383 | 6/1989 | Saito et al. | 235/385 |
| 4,839,508 | 6/1989 | Frolov | 235/482 |
| 4,914,280 | 4/1990 | Peterson | 235/472 |

FOREIGN PATENT DOCUMENTS

| | | |
|---|---|---|
| 0219866 | 4/1987 | European Pat. Off. . |
| 2759196 | 12/1977 | Fed. Rep. of Germany . |
| 3011934 | 3/1980 | Fed. Rep. of Germany . |
| 63-39097 | 2/1988 | Japan . |
| 63-149774 | 6/1988 | Japan . |
| 63-222565 | 9/1988 | Japan . |
| 63-294065 | 11/1988 | Japan . |
| 59-126346 | 8/1989 | Japan . |
| 62-297992 | 12/1989 | Japan . |
| WO87/00322 | 1/1987 | PCT Int'l Appl. . |

*Primary Examiner*—Stuart S. Levy
*Assistant Examiner*—Christophor R. Glembocki
*Attorney, Agent, or Firm*—Frishauf, Holtz, Goodman & Woodward

[57] ABSTRACT

A point of sale-data processing apparatus has a handy type optical scanner for reading a bar code attached or marked on a product. The apparatus performs a predetermined process of sales with regard to the product in accordance with product information previously recorded and corresponding to the read bar code. A scanner holding recess for detachably holding the optical scanner is provided at the outer surface of a main body housing of the apparatus, on which various enter keys and a display panel are provided. The scanner held in the recess orients a bar code read window thereof toward the outside of the recess.

4 Claims, 2 Drawing Sheets

POINT OF SALE DATA PROCESSING APPARATUS FOR HANDY TYPE BAR CODE READER WHICH CAN BE FLUSH MOUNTED

BACKGROUND OF THE INVENTION

1. Field of the Invention

This invention relates to a product-selling-data processing apparatus, comprising an optical scanner, for reading a bar code attached on a product to perform a predetermined process with regard to the product according to a product information recorded in the apparatus and corresponding to the read bar code.

2. Description of the Related Art

An electronic cash register is most widely known as a product-selling-data processing apparatus. The optical scanners used in conventional electronic cash registers are divided into two categories: the fixed type and the handy type.

FIG. 1 schematically shows an electronic cash register combined with a fixed type optical scanner. Electronic cash register 18, in which display panel 10, receipt printer 12, and enter keys 14 are mounted and cash drawer 16 is combined, is placed on table 20 having a predetermined height, and a pair of counters 22 are arranged at a side of table 20. Each counter 22 has the horizontal top surface a height of which is a little lower than the height of the waist of the average-height adult. A fixed type optical scanner 24 is provided between counters 22. The scanner has on the top surface at the center thereof a bar code reading window 26 directed upwards.

Such electronic cash register 18 combined with fixed type optical scanner 24 are used in a relatively large-scale supermarket. Products or commodities sold in such supermarket have different shapes from each other but the sizes thereof are such that they can be put into a shopping basket provided in the supermarket. The weight of each commodity or product is such that the cashiers, mostly women, can handle them relatively easily with one hand. Therefore, the cashier can perform all the steps related to the sale of all commodities or products by picking up commodities or products one after another with one hand from a shopping basket which is placed on one end portion of the top surface of counter, 22, moving a commodity or a product to cross over the fixed type optical scanner 24 which reads the bar code, on the commodity or the product. The product is to moved over bar code reading window 26 of optical scanner 24, and is then put into another basket which is placed on the other end portion of the top surface of counter 22.

Electronic cash register 18 combined with fixed type optical scanner 24 is suitable for quickly processing sales of a large number of commodities or products which are relatively small size and weight. However, such a cash register is not suitable, for processing the sale of commodities or products that are either too heavy or too large for the cashier to hold without using both hands. In handling commodities or products that the cashier cannot move to cross over the bar code reading window 26 of fixed type optical scanner 24 without using holding by both hands, the efficiency of sales processing by using fixed type optical scanner 24 is low and the cashier tends to become tired. Electronic cash register 18 combined with fixed type optical scanner 24 requires a relatively large floor space for installation.

Electronic cash register 18 combined with handy type optical scanner as shown in FIG. 2, is used when floor space for installing the electronic, cash register is small and, when some of the commodities or products are of such weight and size that the cashier can handle them with one hand and speed is not a critical factor, or when the processing of sales of commodities or products of large weight and sizes as described must be done. Handy type scanner 28 is connected by cable 30 to electronic cash register 18.

The disadvantage of electronic cash register 18 combined with handy type optical scanner 28 is that it is difficult for the cashier to carry out in a short time the processing of sales of commodities or products of such weight and size that can be held with hand. Because the cashier, holding the handy type optical scanner in one hand, has to hold a commodity or a product in the other hand, and has to bring optical scanner 28 close to the commodity or product held by the other hand or bring the commodity or product on the other hand close to the optical scanner 24. In other words, the cashier has to use both hands in the processing of a each sale of large number of commodities or products.

Japanese Utility Model Disclosure No. 59-126346 by the same applicant as in this patent application discloses a handy-type-optical-scanner holding member for detachably holding the handy type optical scanner, provided on an inner side edge of a counter arranged in the side of an electronic cash register combined with a handy type optical scanner. However, since in this case the handy type optical scanner is held in a bare state by the holding member, the cashier is liable to cause a commodity or a product to collide with the handy type optical scanner when she or he holds the commodity or product by one hand and passes it in front of the bar code read window of the handy type optical scanner supported by the above-mentioned holding member. Such a collision can damage the commodity or product, or the handy type optical scanner, can deforms the holding member and deteriorate the bar code reading ability of the handy type optical scanner. The special attention needed to avoid such a collision lowers the cashier's sales processing ability.

SUMMARY OF THE INVENTION

This invention has been made in consideration of the above situation and has as its object to provide a product-selling-data processing apparatus combined with an optical scanner, which is capable of processing sales of a large number of products of varying weights and sizes that the cashier can hold by one hand in a short time, and also efficiently handles that must be held by both hands, and which does not require a large floor space for installation.

In order to achieve the above object, a product-selling-data processing apparatus according to this invention comprises an optical scanner for reading a bar code attached or marked on a product to make said apparatus perform a predetermined process of sales with regard to the product in accordance with product information previously recorded in the apparatus and corresponding to the read bar code. Said optical scanner is configured in a handy type; the main body housing, on which various enter keys and a display panel are provided, has a scanner holding recess at the outer surface thereof, the holding recess detachably holding the handy type optical scanner so as to orient a bar code read window of the optical scanner to the outside of the recess.

When that an operator must perform processing of sales of a large number of products of weight and sizes that the operator can hold in one hand in a short time then the product-selling-data processing apparatus of this invention is characterized by being constructed as described above, the handy type optical scanner is held in the holding recess of the outer surface of the main body housing of the product-selling-data processing apparatus.

The operator can perform processing of sales of the products simply by holding each product by one hand and moving it across the bar code read window of the handy type optical scanner held in the scanner holding recess of the main body housing of the selling-data processing apparatus and directing its bar code toward the bar code read window.

When it is necessary to mainly perform processing of sales of products that the operator has to hold with both hands or cannot hold even by both hands, the handy type optical scanner is pulled out from the scanner holding recess of the outer surface of the main body housing of the selling-data processing apparatus to make it portable.

Then, the operator holds the handy type optical scanner and operates it so that the bar code read window of the optical scanner moves across the bar code attached on a large and heavy product placed on a floor or a suitable table near the apparatus. In this manner, processing of sales of such large and heavy product can be performed.

Needless to say, processing of sales of the products that the operator can hold with one hand can be done by operating the handy type optical scanner pulled out of the holding recess of the main body housing of the apparatus to read the bar codes attached on the products.

In the product-selling-data processing apparatus of this invention characterized by being constructed as described above, it is preferable that the holding recess has the dimensions not to project the handy type optical scanner held in the holding recess from the outer surface of the main body housing.

In such construction, the operator need not pay attention to avoid collision of the product held by the operator's one hand with the handy type optical scanner while the scanner is used in the holding recess of the main body housing.

Further, in the product-selling-data processing apparatus of this invention characterized by being constructed as described above, it is also preferable that the handy type optical scanner is held in the holding recess so as to face the bar code read window so that an operator can look toward the apparatus to operate the various keys on the apparatus.

In such construction, the operator's efficiency for processing of sales of the products rises when the handy type optical scanner is used in the holding recess of the main body.

Further, in the product-selling-data processing apparatus of this invention, it is also preferable that a product mounting board is provided at an area, in which the bar code read window of the handy type optical scanner held in the holding recess is exposed outside, in the outer surface of the main body housing so as to extend generally horizontally below the exposed bar code read window.

Such a product mounting board allows the sliding of the products on the board while the products moves across the bar code read window of the handy type optical scanner held in the holding recess.

In a case where the main body housing includes a cash drawer at a lower portion thereof, that the product mounting board is preferably located above the cash drawer and the holding recess is preferably located above the product mounting board.

Further, it is also preferable that the holding recess is located between the various keys and the product mounting board at an area facing an operator, who looks toward the apparatus to operate the apparatus, in the outer surface of the main body housing.

Further, it is also preferable that guide means for making the handy type optical scanner being held in the holding recess in the predetermined state is provided on the surface of the main body housing in which the recess is formed and/or the handy type optical scanner.

DETAILED DESCRIPTION OF THE PREFERRED EMBODIMENT

Figure 1:
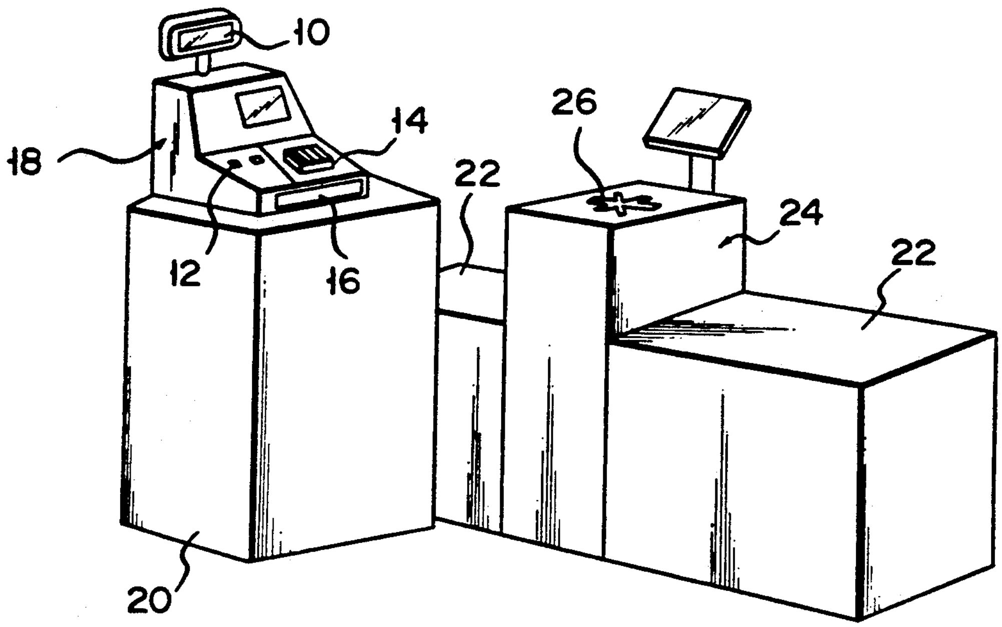
FIG. 1 PRIOR ART
FIG. 1 is a perspective view schematically showing a conventional electronic cash register combined with a fixed type optical scanner, which is one kind of a product-selling-data processing apparatus.
Figure 2:
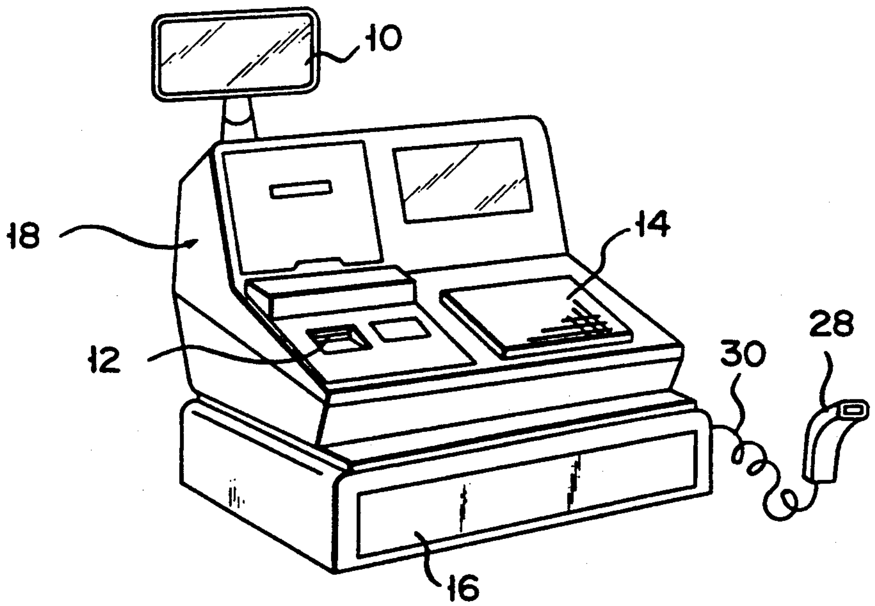
FIG. 2 PRIOR ART
FIG. 2 is a perspective view schematically showing a conventional electronic cash register combined with a handy type optical scanner, which is one kind of a product-selling-data processing apparatus.
Figure 3:
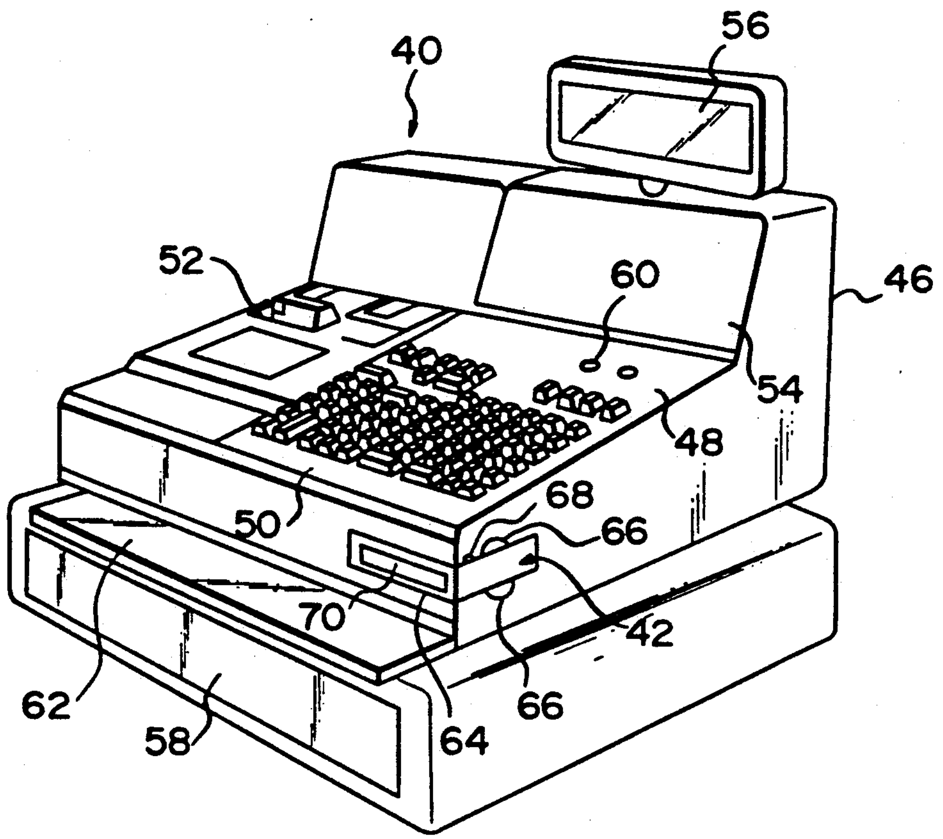
FIG. 3 is a schematic perspective view of an electronic cash register according to an embodiment of this invention, which is one kind of a product-selling-data processing apparatus, wherein a handy type optical scanner is held in a holding recess of a main body housing.

An embodiment of this invention will now be described with reference to FIGS. 3 and 4 attached herewith.

Electronic cash register 40, which is one kind of a product-selling-data processing apparatus, according to an embodiment of this invention is combined with handy type optical scanner 42 formed separately. The internal constructions of electronic cash register 40 and handy type optical scanner 42 has been well known. As shown in FIG. 4, the internal construction of handy type optical scanner 42 is connected by electric cable or optical cable 44 to the internal construction of electronic cash register 40.

The slightly inclined top surface of main body housing 46 of electronic cash register 40 constitutes operation panel 48, on which receipt issuing port 52 and various keys 50 for entering various informations into the internal construction of main body housing 46 are provided.

The highest rearmost portion of main body housing 46 rises sharply upwardly, and main display panel 54 is provided thereon. On the top end of the rearmost portion of housing 46, auxiliary display panel 56 is mounted to be freely rotatable in a horizontal plane.

At the bottom of housing 46, there is provided cash drawer 58. Cash drawer 58 can be moved forwardly to be exposed from housing 46.

Various keys 50 includes the numeric keys for entering numeric data, such as the sum of money handed over by the customer and the number of sold products, and the function keys, such as the classification keys for entering the classification of the sold products, the subtotal key, and the total key for obtaining the total sum of the sold products.

Also provided on operation panel 48, between various keys 50 and main display panel 54 is control lock 60. Control lock 60 is used for switching the function of internal construction of electronic cash register 40 from the sales processing function including ordinary sales amount calculation to the program setting function for setting a desired function to the function keys or the account adjusting function. Main display panel 54 and auxiliary display panel 56 display information entered with various keys 50 such as the names, classification codes and prices of products, and the total sum. Main display panel 54 is for the cashier and auxiliary display panel 56 is for the customer.

Elongated product mounting board 62 is formed at the substantially vertical front surface of main body housing 46, which is downwardly continuously formed from operation panel 48, so as to be located above the cash drawer 58 and extends in a horizontal direction.

At the right corner of the front surface of main body housing 46, handy-type-optical-scanner holding recess 64 is formed above product mounting board 62. Holding recess 64 has generally the same shape and dimensions as handy type optical scanner 42. Handy-type-optical-scanner holding recess 64 opens in an area extending from the right end portion of the front surface of main body housing 46 to the front end portion of the right side surface thereof. Electrical or optical cable 44 is led to scanner holding recess 64 as shown in FIG. 4 and passed through an opening, not shown, formed in the internal surface of scanner holding recess 64 and connected to a cable automatic winding apparatus, not shown, which is of well-known construction utilizing a spiral spring and is housed in main body housing 46.

A pair of notches 66 for inserting two fingers of a cashier as an operator in this embodiment are formed at the upper and lower edges of the right side opening of scanner holding recess 64.

In the upper internal surface of scanner holding recess 64, guide groove 68 is formed so as to extend from the upper edge of the right side opening of scanner holding recess 64 to be in parallel with the front surface of main body housing 46.

Elongated guide projection 72 is formed on the top surface of the housing of handy type optical scanner 42, which is located at the top of the housing when bar code read window 70 is oriented in the same direction as that the front surface of main body housing 46 is directed. Guide projection 72 extends to be generally in parallel with the bar-code-read-window forming surface of the housing of scanner 42 at the position corresponding to guide groove 68 of scanner holding recess 64. Guide projection 72 of the housing of handy type optical scanner 42 and guide groove 68 of scanner holding recess 64 form guide means for guiding handy type optical scanner 42 into the specified position in scanner holding recess 64 disposing it in the specified posture.

At the right end portions of the top and bottom surfaces of the housing of handy type optical scanner 42 disposed in the above-mentioned posture, finger-tip engaging depressions 74 are formed to correspond to a couple of notches 66 of scanner holding recess 64.

In a case that the cashier must perform processing of sales of a large number of commodities or products of weight and sizes that she or he can hold by one hand in a short time with electronic cash register 40 constructed as described according to an embodiment of this invention, handy type optical scanner 42 can be inserted through the opening of scanner holding recess 64 in the right side surface of main body housing 46 into scanner holding recess 64 as guide projection 72 of the housing of handy type optical scanner 42 is guided by guide groove 68 of scanner holding recess 64. Handy type optical scanner 42 is inserted into scanner holding recess 64 until the right side surface of scanner 42 comes to be generally flush with the right side surface of main body housing 46 as shown in FIG. 3. Under this condition, the couple of finger tip engaging depressions 74 at the right end portions of the top and bottom surfaces of handy type optical scanner 42 are located in the couple of notches 66 at the upper and lower edges of the right side opening of scanner holding recess 64. The bar-code-read-window forming surface of the housing of handy type optical scanner 42 will be flush with or located deeper than the front surface of main body housing 46 as shown in FIG. 3. The above described front surface faces the cashier who looks toward electronic cash register 40 to operate various keys 50 in operation panel 48.

The cashier can perform processing of sales of the products simply by holding each product by one hand and moving it across bar code read window 70 of handy type optical scanner 42 held in scanner holding recess 64 of main body housing 46 of electronic cash register 40 with directing its bar code toward the bar code read window 70. In this case, the cashier slides the product, with her one hand, along the product mounting board.

Figure 4:
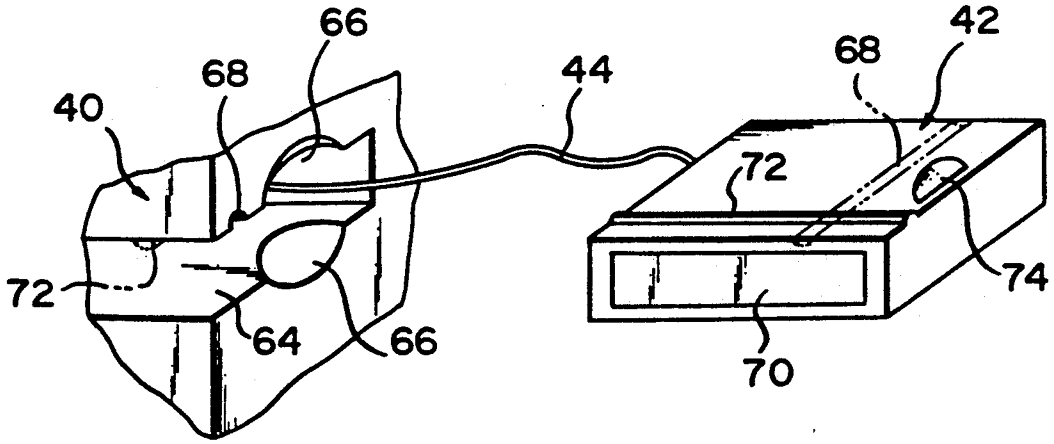
FIG. 4 is a perspective view schematically showing the handy type optical scanner withdrawn from the holding recess of the main body housing of the electronic cash register of FIG. 3.

When it is necessary to mainly perform processing of sales of products that the cashier has to hold with both hands or cannot hold with both hands, handy type optical scanner 42 is pulled out from scanner holding recess 64 by inserting a couple of finger tips into the couple of notches 66 at the upper and lower edges of the right side opening of scanner holding recess 64, engaging the two finger tips into two finger-tip engaging depressions 74 at the right end portions of the upper and lower surfaces of the housing of handy type optical scanner 42, and withdrawing handy type optical scanner 42 out of holding recess 64 of main body housing 46 of electronic cash register, as shown in FIG. 4.

Then, the cashier holds handy type optical scanner 42 and operates optical scanner 42 so that bar code read window 70 of optical scanner 42 moves across bar code attached on a large and heavy commodity or product, not shown, placed on a floor or a suitable table near electronic cash register 40. In this manner, processing of sales of large and heavy items can be performed.

Needless to say, processing of sales of products of such weight and sizes that the cashier can hold by one hand can be done by operating handy type optical scanner 40 pulled out of holding recess 64 of main body housing 46 of electronic cash register 40 to read bar codes attached on the products.

The above embodiment is merely illustrated for the sole purpose of explaining the present invention does not restrict the present invention. Various other changes and modifications may be made without departing from the scope of this invention.

For example, guide groove 68 and guide protrusion 72, which jointly form guide means for handy type optical scanner 42, may include two or more guide means.

In contrast to the above described embodiment, guide groove 68 and guide projection 72 may be provided respectively on the upper surface of the housing of handy type optical scanner 42 and the upper inner surface of scanner holding recess 64.

Guide groove 68 and guide protrusion 72 may be respectively extending in a direction, which orients from the front opening of scanner holding recess 64 toward the rear surface of main body housing 46, and in a direction, which orients from the bar-code-reading-window forming surface of the housing of scanner 42 to the opposing-direction orienting surface of the housing, as shown by two-dot chain line in FIG. 4. In this case, a couple of notches 66 should be formed at the upper and lower edges of the opening of scanner holding recess 64 in the front surface of main body housing 46, and a couple of finger-tip engaging depressions 74 should be formed at regions near to the bar-code-reading-window forming surface in the upper and lower surfaces of the housing of handy type optical scanner 42 so as to correspond to the couple of notches 66 of main body housing 46.

Guide groove 68 or guide protrusion 72 may be formed both at the upper and the lower internal surfaces of scanner holding recess 64 and also both at the top and bottom surfaces of the housing of handy type optical scanner 42. However, the number of guide groove 68 or guide protrusion 72 and the arrangement thereof formed on the upper and lower surfaces must be different and not be symmetrical. This prevents handy type optical scanner 42 from being inserted into scanner holding recess 64 with bar code read window 70 directed to the rear of main body housing 46.

What is claimed is:

1. A point of sale data processing apparatus, which has a handy type bar code reader, which includes a bar code read window, which performs predetermined processes on the basis of bar code information read out from a bar code attached to a sales product when the handy type bar code reader reads the bar code, and which stores the bar code information, comprising:

a housing, having a plurality of walls, for enclosing said data processing apparatus therein;

data entry keys mounted on a first of said plurality of walls of said housing so as to be opposed to and directed toward an operator of said apparatus; and a display panel, mounted on said housing, for displaying at least a part of the read out bar code information;

said housing further having a holding recess, formed under said keys, for detachably holding said bar code reader so that said bar code reader is received entirely in said holding recess without projecting out therefrom, and the bar code read window of said bar code reader, when said bar code reader is received in said holding recess, is flush with a second wall of said plurality of walls which joins said first wall on which said data entry keys are mounted , said second wall and said bar code read window facing the operator at least one corner formed by said plurality of walls of said housing;

said holding recess being positioned at said at least one corner;

said at least one corner being defined by said second wall and a third wall of said plurality of walls forming said housing;

said third wall being adjacent to said second wall and extending substantially perpendicular thereto;

said holding recess including openings in both said second and third walls defining at least one corner; and guide means provided in said handy type bar code reader and in said holding recess to guide said handy type bar code reader into and out of said holding recess through said opening in said third wall.

2. A point of sale data processing apparatus according to claim 1, further comprising product guide means integrally formed under said holding recess in said housing, said product guide means guiding and supporting said sales product with bar codes thereon so that the bar codes can be positioned in front of the bar code read window of said bar code reader to be read out by said bar code reader while said bar code reader is held in said holding recess.

3. A point of sale data processing apparatus according to claim 2, further comprising a cash drawer mounted under said product guide means in said housing.

4. A point of sale data processing apparatus according to claim 1 in which said housing has a right hand side and lefthand side when viewed by an operator facing said housing, and wherein said corner is defined at said right hand side of said housing.

* * * * *